3,197,296
GLASS COMPOSITION AND METHOD OF PRODUCING TRANSPARENT PHOTOTROPIC BODY
Richard A. Eppler and Stanley D. Stookey, Corning, N.Y., assignors to Corning Glass Works, Corning, N.Y., a corporation of New York
Filed Nov. 14, 1962, Ser. No. 237,627
4 Claims. (Cl. 65—33)

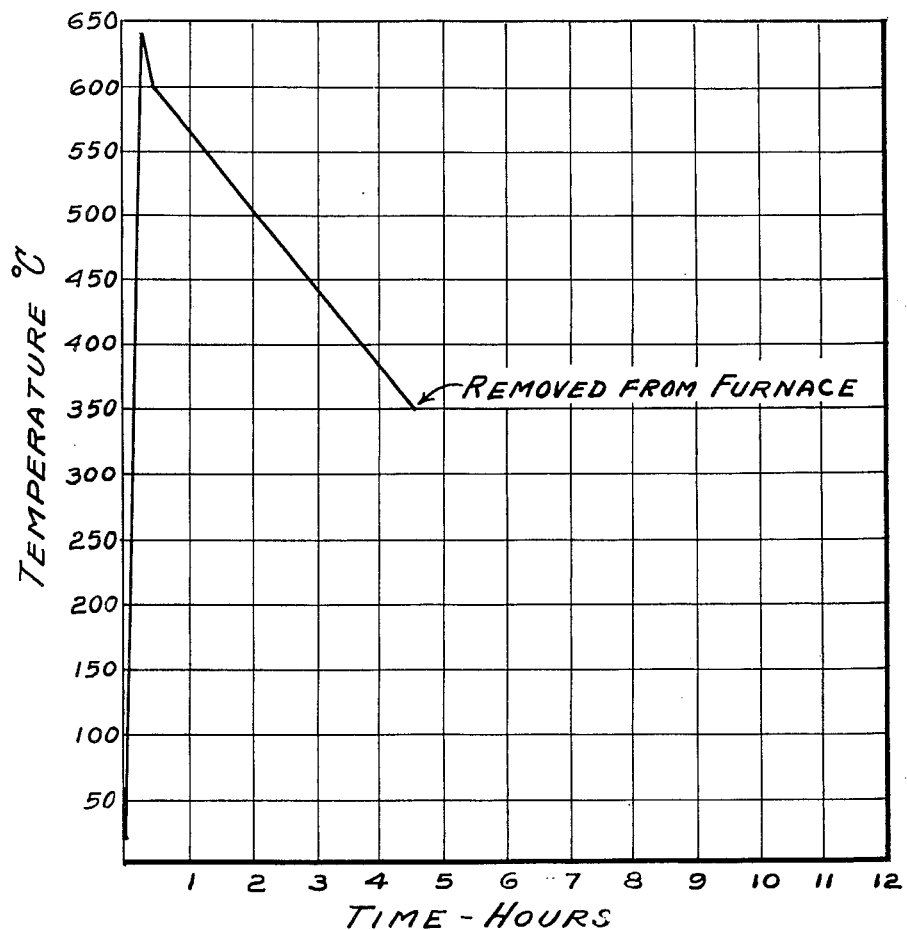

This invention relates to a novel glass composition and a method of processing it for ophthalmic applications, more particularly sun glasses.

In co-pending application Serial No. 213,634, filed July 31, 1962, by S. D. Stookey and W. H. Armistead, of which one of the present applicants is a co-inventor, is disclosed a glass composition comprising submicroscopic crystals of radiation sensitive materials dispersed throughout the glassy matrix which imparts to the glass composition the characteristic that the transparency of the glass to visible radiation is reversibly varied by the amount of actinic radiation incident thereon. While such glasses are eminently suitable for a wide variety of applications including windows for buildings and the like, it would be highly desirable to have a glass which darkens and fades rapidly while at the same time achieving an adequate degree of darkness in ophthalmic thicknesses (i.e., about 2 mm.) when exposed to the sun's rays, for use as opthalmic lenses. Furthermore, glasses for such application should preferably have a refractive index ($n_D$) of 1.52–1.54, to permit their use without requiring alteration of equipment utilized by opticians for grinding and measuring lenses made therefrom.

The principal object of this invention is to provide glass compositions which can be utilized for opthalmic lenses and which reversibly vary in their transparency to visible light depending upon the amount of actinic radiation incident thereon.

A second object of this invention is to provide a method of treating a glass composition to make it suitable for opthalmic lenses which provide the eyes of the wearer thereof protection from high intensity visible radiation.

A still further object of this invention is to provide lenses for opthalmic purposes which are essentially transparent to visible radiation, i.e., they generally have an initial transmission to visible radiation of about 92%, but will darken upon exposure to actinic radiation and will have a transmission to visible radiation of less than about 45% of their original value, i.e., they generally have a transmission to visible radiation of less than 40%, when exposed to bright natural actinic radiation, and which will have a half-fading time, as described below, of not more than five minutes.

We have found that the principal object of the invention can be achieved in a glass composition consisting essentially, on the weight percent basis, of 48–57% $SiO_2$, 6–10% $Al_2O_3$, 15–22% $B_2O_3$, 0.8–2% $Na_2O$, 2.4–3.1% $Li_2O$, 0–4% $K_2O$, the total $Li_2O+Na_2O+K_2O$ being 3.2–7.2%, 4.5–5.3% PbO, 3–9% BaO, 0–7.2% $ZrO_2$, 0.15–0.6% Ag, 0.01–0.02% CuO, 0.3–1.2% Cl, 0–1.0% Br, 0–0.1% I, and 0–0.2% F. Glasses of this composition are produced in accordance with conventional glass practice by melting the desired batch in a suitable container, forming the molten glass to the desired shape, thereafter heat treating it by exposing it to a temperature within the range of about 500°–750° C. for a sufficient time to cause the participation of the submicroscopic crystals of radiation-sensitive material within the glass, thereby providing the desired phototropicity, this exposure ranging generally from about 1–7 hours, but sometimes longer, at the lower extreme of this temperature range, to $\frac{1}{20}$ to $\frac{1}{2}$ hour at the higher extreme of the stated temperature range, and then cooling to room temperature, often in a controlled manner such that the glass is annealed.

The change in transmission of visible radiation caused by exposing the glass, having a 2 mm. thickness, to actinic radiation having wave lengths of from about 3000 A. to 4500 A. is measured in accordance with conventional practice. It is first measured before exposure to any appreciable amount of actinic radiation and then the decrease in transmission is measured continuously in the same manner as the glass is exposed to ultra-violet radiation (3650 A.) produced by a commercial "Mineralite" long-wave ultra-violet lamp having a 9-watt input, the output being filtered to remove a major proportion of the visible energy and being distributed over an area of about 4 square inches. The measurement of the increase in darkening is continued until no measurable change is noted over a five minute interval. This is considered the absolute minimum transmission of the glass and referred to as transmission at infinite exposure ($T_\infty$) as compared to initial transmission ($T_0$). The fading rate is then determined by removing the actinic radiation having a wave length of 3000 A. to 4500 A. from the surface of the glass by means of a commercial cutoff filter opaque to radiation below 5000 A. and continuing to record the transmission of the glass and noting the time that it takes to recover to the geometric average ($\sqrt{T_0 \times T_\infty}$) of the initial transmission ($T_0$) and the transmission at infinite exposure ($T_\infty$). This is referred to as a half-fading time ($h_{FT}$).

The constituents of the glass are critical in order that the glass may be heat-treated so as to have the desired phototropic darkening and fast fading. Thus the compositions containing the prescribed constituents, but outside of the stated ranges, either above or below, cannot be sufficiently heat-treated to have the desired degree of darkening without the development of haze within the glass and unnecessarily increasing the time required for the glass to fade and, conversely, if the heat treatment is limited so as to achieve fast-fading, the glass does not achieve the desired degree of darkening upon irradiation. Furthermore, the $ZrO_2$, BaO, and PbO have a very noticeable effect on the refractive index of the glass, and this index must be controlled primarily by the amounts of these three constituents to have an $n_D$ between 1.52–1.54 for opthalmic applications, which, as explained above, is desirable because the ophthalmic industry has standardized its apparatus to process glass within this range of refractive indices.

Examples of suitable glass, on a weight percent basis, are set forth in Table I.

Table I

|  | 1 | 2 | 3 | 4 | 5 | 6 |
|---|---|---|---|---|---|---|
| $SiO_2$ | 53.1 | 52.4 | 53.7 | 53.5 | 53.8 | 53.7 |
| $Al_2O_3$ | 7.0 | 7.0 | 7.1 | 7.1 | 7.1 | 7.1 |
| $B_2O_3$ | 20.3 | 20.0 | 20.5 | 20.4 | 20.5 | 20.5 |
| $Na_2O$ | 0.9 | 0.9 | 0.9 | 0.9 | 0.9 | 0.9 |
| $Li_2O$ | 3.0 | 3.0 | 3.1 | 3.1 | 3.1 | 3.1 |
| $Na_2O+Li_2O$ | 3.9 | 3.9 | 4.0 | 4.0 | 4.0 | 4.0 |
| PbO | 4.9 | 4.8 | 4.9 | 4.9 | 4.9 | 4.9 |
| BaO | 6.1 | 3.9 | 8.5 | 8.4 | 8.5 | 8.5 |
| $ZrO_2$ | 3.6 | 7.1 | | | | |
| Ag | 0.55 | 0.54 | 0.56 | 0.55 | 0.32 | 0.32 |
| Cl | 0.46 | 0.46 | 0.78 | 1.04 | 0.78 | 1.04 |
| CuO | 0.016 | 0.016 | 0.016 | 0.016 | 0.016 | 0.016 |

|                | 7     | 8     | 9     | 10    | 11    | 12    |
|----------------|-------|-------|-------|-------|-------|-------|
| $SiO_2$        | 51.1  | 49.9  | 51.0  | 51.0  | 52.4  | 52.6  |
| $Al_2O_3$      | 6.8   | 6.6   | 6.8   | 6.8   | 7.0   | 7.0   |
| $B_2O_3$       | 19.5  | 19.0  | 19.5  | 19.5  | 20.0  | 20.1  |
| $Na_2O$        | 1.7   | 1.7   | 1.7   | 1.7   | 1.8   | 1.8   |
| $Li_2O$        | 2.5   | 2.4   | 2.5   | 2.5   | 2.6   | 2.6   |
| $Na_2O+Li_2O$  | 4.2   | 4.1   | 4.2   | 4.2   | 4.2   | 4.2   |
| $PbO$          | 4.7   | 4.6   | 4.7   | 4.7   | 4.8   | 4.8   |
| $BaO$          | 8.0   | 7.9   | 8.0   | 8.0   | 8.3   | 8.3   |
| $ZrO_2$        | 4.6   | 6.7   | 4.6   | 4.6   | 2.1   | 1.8   |
| $Ag$           | 0.30  | 0.30  | 0.30  | 0.30  | 0.31  | 0.31  |
| $Cl$           | 0.74  | 0.73  | 0.69  | 0.64  | 0.76  | 0.77  |
| $Br$           |       |       | 0.11  | 0.22  |       |       |
| $F$            |       | 0.26  |       |       |       |       |
| $CuO$          | 0.016 | 0.015 | 0.016 | 0.016 | 0.016 | 0.016 |

|                | 13    | 14    | 15    | 16    | 17    | 18    |
|----------------|-------|-------|-------|-------|-------|-------|
| $SiO_2$        | 52.8  | 53.0  | 52.5  | 52.4  | 52.2  | 51.9  |
| $Al_2O_3$      | 7.0   | 7.0   | 7.0   | 6.9   | 6.9   | 6.9   |
| $B_2O_3$       | 20.1  | 20.2  | 20.0  | 20.0  | 19.9  | 19.8  |
| $Na_2O$        | 1.8   | 1.8   | 1.8   | 1.8   | 1.8   | 1.8   |
| $Li_2O$        | 2.6   | 2.6   | 2.6   | 2.6   | 2.6   | 2.6   |
| $Na_2O+Li_2O$  | 4.2   | 4.4   | 4.2   | 4.4   | 4.4   | 4.4   |
| $PbO$          | 4.8   | 4.9   | 4.8   | 4.8   | 4.8   | 4.8   |
| $BaO$          | 8.3   | 8.4   | 8.3   | 8.2   | 8.2   | 8.2   |
| $ZrO_2$        | 1.4   | 1.1   | 2.0   | 2.1   | 2.3   | 2.6   |
| $Ag$           | 0.31  | 0.31  | 0.31  | 0.31  | 0.31  | 0.31  |
| $Cl$           | 0.77  | 0.77  | 0.77  | 0.66  | 0.56  | 0.35  |
| $Br$           |       |       |       | 0.23  | 0.46  | 0.91  |
| $F$            |       | 0.27  |       |       |       |       |
| $CuO$          | 0.016 | 0.016 | 0.016 | 0.016 | 0.016 | 0.016 |

|                | 19    | 20    | 21    | 22    | 23    |
|----------------|-------|-------|-------|-------|-------|
| $SiO_2$        | 51.2  | 50.4  | 51.9  | 51.9  | 52.1  |
| $Al_2O_3$      | 6.8   | 6.7   | 6.9   | 6.9   | 6.9   |
| $B_2O_3$       | 19.5  | 19.2  | 19.8  | 19.8  | 19.9  |
| $Na_2O$        | 1.7   | 1.7   | 1.8   | 1.8   | 1.8   |
| $Li_2O$        | 2.5   | 2.5   | 2.6   | 2.6   | 2.6   |
| $Na_2O+Li_2O$  | 4.2   | 4.2   | 4.4   | 4.4   | 4.4   |
| $PbO$          | 4.7   | 4.6   | 4.8   | 4.8   | 4.8   |
| $BaO$          | 8.1   | 7.9   | 6.0   | 3.8   | 8.2   |
| $ZrO_2$        | 3.6   | 4.6   | 4.8   | 7.0   | 2.0   |
| $Ag$           | 0.30  | 0.30  | 0.31  | 0.31  | 0.24  |
| $Cl$           | 0.35  | 0.34  | 0.35  | 0.35  | 0.35  |
| $Br$           | 0.90  | 0.88  | 0.91  | 0.91  | 0.91  |
| $F$            | 0.27  | 0.79  |       |       | 0.27  |
| $CuO$          | 0.016 | 0.015 | 0.016 | 0.016 | 0.016 |

|                | 24    | 25    | 26    | 27    | 28    |
|----------------|-------|-------|-------|-------|-------|
| $SiO_2$        | 55.1  | 53.3  | 56.2  | 53.3  | 55.1  |
| $Al_2O_3$      | 8.5   | 9.3   | 7.5   | 9.3   | 8.5   |
| $B_2O_3$       | 16.3  | 17.3  | 15.0  | 17.3  | 16.3  |
| $Na_2O$        | 1.9   | 1.8   | 1.9   | 1.8   | 1.9   |
| $Li_2O$        | 2.7   | 2.6   | 2.8   | 2.6   | 2.7   |
| $Na_2O+Li_2O$  | 4.6   | 4.4   | 4.7   | 4.4   | 4.6   |
| $PbO$          | 5.1   | 4.9   | 5.2   | 4.9   | 5.1   |
| $BaO$          | 7.2   | 7.6   | 8.9   | 7.6   | 6.7   |
| $ZrO_2$        | 1.9   | 1.8   | 1.9   | 1.8   | 2.2   |
| $Ag$           | 0.24  | 0.24  | 0.25  | 0.18  | 0.29  |
| $Cl$           | 0.32  | 0.31  | 0.33  | 0.31  | 1.02  |
| $Br$           | 0.60  | 0.58  | 0.62  | 0.90  | 0.19  |
| $F$            | 0.29  | 0.28  | 0.29  | 0.28  |       |
| $CuO$          | 0.017 | 0.016 | 0.017 | 0.016 | 0.017 |

The glasses of this invention may be obtained by melting the batch ingredients in suitable proportion, utilizing conventional melting techniques, in crucibles, pots, or tanks to produce the desired glass composition. In most instances, this is accomplished by exposing the batch to a temperature of from 1400°–1500° C. for at least about 4 hours. The molten glass is then formed to articles of the desired shape by conventional glass-working techniques such as drawing, pressing, rolling, blowing, and the like, which simultaneously cools the glass below its softening point (about 640°–670° C.). The formed article may then be cooled to room temperature, with a conventional annealing step such as exposing it to a temperature of 400°–480° C. for ½ to 2 hours or may be merely cooled within the temperature range for heat-treatment and then to room temperature in accordance with the process more fully explained hereinafter.

The desired phototropic properties of the above-described glasses are obtained by exposing the formed glass articles to a temperature range of from 500°–750° C. for a sufficient time to develop the desired crystallization of the radiation sensitive crystals and thereafter cooling the glass to an ambient temperature. The time necessary to achieve this crystallization is somewhat dependent upon the temperature utilized; longer times, about 1–7 hours, being necessary at the lower portion of the range (500°–550° C.) while shorter times, about 1/20 to ½ hour, are sufficient at the higher portion of the range (720°–750° C.).

The heating rate utilized to bring the glass body from room temperature to the temperature of heat treatment does not appear to affect the results. In fact, as has been previously stated, the glass may be cooled directly from the forming temperature to the heat-treatment temperature. On the other hand, the rate at which the article is cooled from the heat treatment temperature to room temperature after the desired crystallization has been obtained is significant. Satisfactory results can be obtained, either when the body is immediately removed from the heat-treatment furnace to room temperature or slowly cooled therein at a rate of about 1° C. per minute. For example, we have found that the fading rate of the glass is improved, without appreciable adverse effect upon the darkening capability by cooling the article at a rate of less than 2° C. per minute, preferably 1° C. per minute, from the heat-treatment temperature to a temperature in the range of 325° C. to 425° C., preferably 350° C., whence it is removed to atmospheric conditions which rapidly cool it to ambient temperatures.

While the above-described heat-treatment conditions give satisfactory results, we have also found that glasses which contain bromine or iodine as a constituent thereof, should preferably be given a somewhat more intense heat treatment within the aforementioned limitations. This can be accomplished by subjecting it to a heat treatment utilizing the longer times above specified within the described temperature range, and in particular utilizing the times of from about 2–4 hours at a temperature of 620° C. to about ½ to 1 hour at a temperature of 720° C.

The above-defined heat treatment is critical to the present invention because it is necessary to heat treat the glass for a sufficient time and/or high enough temperature in order to achieve the desired darkening of the glass in 2 mm. thicknesses whereas too high a temperature and/or too long a heat treatment results in a slow fading article and may produce visible crystallization which scatters visible light rays thereby decreasing the initial transmission of the glass.

A wide variety of suitable heat treatments which have been found satisfactory are set forth in Table II.

*Table II*

| Designation | Treatment Temp. (° C.) | Hold time (minutes) | Cooling rate (° C./min.°) | Removal temperature (° C.) |
|---|---|---|---|---|
| A | 560 | 120 |  | 560 |
| B | 560 | 120 | 1 | 400 |
| C | 580 | 90 | 1 | 400 |
| D | 580 | 90 | 1 | 350 |
| E | 580 | 90 | 1 | 20 |
| F | 600 | 90 |  | 600 |
| G | 600 | 90 | 1 | 400 |
| H | 600 | 90 | 1 | 350 |
| I | 600 | 90 | 1 | 20 |
| J | 500 / 600 | 240 / 90 | 1 | 20 |
| K | 620 | 60 | 1 | 600 |
| L | 620 | 60 | 1 | 350 |
| M | 620 | 60 | 1 | 20 |
| N | 640 | 60 | 1 | 350 |
| O | 640 | 60 | 10–600 / 1–350 | 350 |
| P | 660 | 30 | 10–600 / 1–350 | 350 |
| Q | 700 | 15 | 10–600 / 1–350 | 350 |
| R | 700 | 8 | 10–600 / 1–350 | 350 |
| S | 700 | 3 | 10–600 / 1–350 | 350 |

The phototropic characteristics of 2 mm. thick, ground-and-polished pieces of the glass compositions described in Table I when processed in accordance with the procedure described on page 3 with the heat treatments set forth in Table II are listed in Table III.

*Table III*

| Example No. | Heat-treatment | $T_o$ (percent) | $T_{oo}$ (percent) | $h_{FT}$ (seconds) |
|---|---|---|---|---|
| 1 | C | 94 | 28 | 292 |
|   | G | 95 | 27 | 224 |
|   | D | 96 | 26 | 285 |
| 2 | A | 96 | 39 | 238 |
|   | C | 94 | 32 | 236 |
|   | D | 95 | 34 | 210 |
| 3 | C | 94 | 34 | 171 |
|   | F | 96 | 27 | 250 |
| 4 | E | 96 | 28 | 274 |
|   | F | 96 | 37 | 186 |
| 5 | A | 95 | 33 | 270 |
|   | H | 95 | 34 | 196 |
| 6 | H | 94 | 40 | 144 |
|   | H | 93 | 31 | 204 |
| 7 | A | 95 | 34 | 231 |
|   | H | 95 | 24 | 247 |
| 8 | B | 95 | 23 | 189 |
|   | D | 94 | 33 | 187 |
| 9 | F | 91 | 29 | 267 |
|   | H | 94 | 30 | 256 |
| 10 | I | 93 | 33 | 236 |
|    | J | 94 | 27 | 263 |
| 11 | B | 94 | 36 | 183 |
|    | D | 95 | 34 | 212 |
| 12 | F | 95 | 30 | 278 |
|    | H | 95 | 32 | 232 |
|    | I | 93 | 34 | 252 |
|    | J | 94 | 27 | 289 |
| 13 | B | 94 | 30 | 177 |
|    | H | 94 | 31 | 274 |
|    | F | 95 | 29 | 284 |
|    | H | 95 | 30 | 276 |
|    | I | 94 | 33 | 276 |
| 14 | B | 94 | 29 | 273 |
|    | D | 95 | 30 | 252 |
| 15 | H | 95 | 31 | 165 |
|    | K | 93 | 38 | 291 |
| 16 | K | 95 | 27 | 290 |
|    | L | 96 | 32 | 214 |
|    | M | 95 | 28 | 249 |
|    | P | 96 | 25 | 283 |
|    | R | 94 | 26 | 291 |
|    | S | 94 | 26 | 288 |
| 17 | L | 95 | 33 | 238 |
|    | M | 96 | 37 | 212 |
|    | N | 95 | 26 | 280 |
| 18 | N | 94 | 39 | 218 |
|    | O | 92 | 31 | 282 |
|    | P | 90 | 30 | 294 |
| 19 | K | 96 | 28 | 280 |
|    | L | 96 | 37 | 234 |
|    | N | 92 | 34 | 262 |
|    | O | 96 | 37 | 258 |
|    | P | 90 | 32 | 276 |
|    | Q | 86 | 36 | 246 |
|    | S | 93 | 34 | 276 |
| 20 | H | 95 | 40 | 86 |
|    | K | 93 | 35 | 193 |
|    | M | 95 | 40 | 177 |
| 21 | N | 96 | 40 | 192 |
|    | Q | 91 | 37 | 255 |
| 22 | L | 92 | 31 | 194 |

The preferred embodiment of our invention is the glass of Example 23 which is preferably prepared by melting the following batch in a platinum crucible in an electric fired furnace at 1450° C. for 6 hours:

| | |
|---|---|
| —52 steuben sand | 187.4 |
| Low iron petalite | 412.3 |
| Anhydrous boric acid | 201.0 |
| $NaNO_3$ | 22.9 |
| $Li_2CO_3$ | 16.2 |
| Litharge | 47.8 |
| Barium carbonate | 106.7 |
| Zircon | 30.0 |
| $AgNO_3$ | 3.6 |
| NaCl | 5.8 |
| CuO | .16 |
| NaBr | 11.7 |
| $Na_2SiF_6$ | 4.5 |

The molten glass is then poured out on a steel slab and rolled to a thickness of about ¼″. The slab is then immediately placed in an annealing furnace at a temperature of 450° C., maintained thereat for 1 hour and cooled at 5° C./minute to 200° C. and removed to room temperature. The slab is then cut to the desired size for opthalmic lenses and ground and polished to 2 mm. thickness. The lens blanks are then heated rapidly, preferably in about 15 minutes, to 640° C. and heat-treated according to schedule O of Table II. This preferred heat treatment is illustrated in the time-temperature chart shown in the accompanying figure.

What is claimed is:

1. A glass having a $n_D$ between 1.52–1.54 consisting essentially on a weight percent basis of 48–57% $SiO_2$, 6–10% $Al_2O_3$, 15–22% $B_2O_3$, 0.8–2.0% $Na_2O$, 2.4–3.1% $Li_2O$, 0–4% $K_2O$, the total $Li_2O+Na_2O+K_2O$ being 3.2–7.2%, 4.5–5.3% PbO, 3–9% BaO, 0–7.2% $ZrO_2$, 0.15–0–6% Ag, 0.01–0.02% CuO, 0.3–1.2% Cl, 0–1.0% Br, 0–1.0% I, and 0–1.2% F.

2. The method of producing a phototropic glass body essentially transparent to visible radiation but which will have a transmission to visible radiation of less than about 45% of its original value upon exposure to actinic radiation of a wave length between 3000 A. and 4500 A., a half-fading time of less than 300 seconds, and a $n_D$ of between 1.52–1.54, which comprises melting a batch for a glass composition consisting essentially on a weight basis of 48–57% $SiO_2$, 6–10% $Al_2O_3$, 15–22% $B_2O_3$, 0.8–2% $Na_2O$, 2.4–3.1% $Li_2O$, 0–4% $K_2O$, the total $Li_2O+Na_2O+K_2O$ being 3.2–7.2%, 4.5–5.3% PbO, 3–9% BaO, 0–7.2% $ZrO_2$, 0.15–0.6% Ag, 0.01–0.02% CuO, 0.3–1.2% Cl, 0–1.0% Br, 0–1.0% I, and 0–1.2% F, forming the molten glass to the desired shape, and thereafter heat treating said shape by exposing it to a temperature range of about 500°–750° C. for a sufficient time to cause the precipitation of submicroscopic crystals of radiation-sensitive material within the glass.

3. The method of claim 2 in which the time sufficient to cause the precipitation of submicroscopic crystals of radiation-sensitive material within the glass ranges from about 1–7 hours at the lower extreme of said temperatures to about 1/20–½ hour at the higher extreme of said temperatures.

4. The method of claim 2 in which the article is cooled from the heat treating temperature range at a rate of less than 2° C. per minute to a temperature of from 325°–425° C. and thereafter exposing it to room temperature.

References Cited by the Examiner

UNITED STATES PATENTS

| | | | |
|---|---|---|---|
| 2,049,765 | 8/36 | Fischer | 252—301.4 |
| 2,219,895 | 10/40 | Hanlein | 252—301.4 |
| 2,971,853 | 2/61 | Stookey | 106—52 |

OTHER REFERENCES

Weyl: "Coloured Glasses," (1959) by Dawson's of Pall Mall, London (pages 367–368, 379, 500–521).

TOBIAS E. LEVOW, *Primary Examiner.*